United States Patent [19]
Jacob

[11] Patent Number: 4,611,421
[45] Date of Patent: Sep. 16, 1986

[54] SUPPORT FOR GOOSE DECOY

[76] Inventor: Steven R. Jacob, Rte. 3, Sebeka, Minn. 56477

[21] Appl. No.: 798,826

[22] Filed: Nov. 18, 1985

[51] Int. Cl.⁴ .......................................... A01M 31/06
[52] U.S. Cl. ............................................. 43/3; 43/2; 73/188
[58] Field of Search .......................... 43/3, 2; 73/188

[56] References Cited
U.S. PATENT DOCUMENTS 2,267,357 12/1941 Soule ........................................ 43/3
2,483,680 10/1949 Timm et al. ............................. 43/3
4,062,141 12/1977 Shjeflo ...................................... 43/3

Primary Examiner—Nicholas P. Godici
Assistant Examiner—Karen Skillman
Attorney, Agent, or Firm—Merchant, Gould, Smith, Edell, Welter & Schmidt

[57] ABSTRACT

A decoy is disclosed having a head portion and a neck portion made of relatively rigid material and formed to simulate the head and neck of a water fowl. A body portion is provided including a hoop member and a flexible bag of wind sock construction having an opening maintained in open condition by said hoop member. A hoop support is provided for supporting the hoop member for rotation about a generally vertical axis of rotation generally coincident with a diameter of the hoop. The hoop support includes a strip of resilient material extending from the support into the bag and terminating at a free end adjacent the tail. A spreader is connected to the free end with the free end centrally located on the spreader at the tail of the bag with the spreader maintaining the strip centrally along an upper panel of the flexible bag. The head and body portion are also connected to the support member for rotation therewith.

12 Claims, 7 Drawing Figures

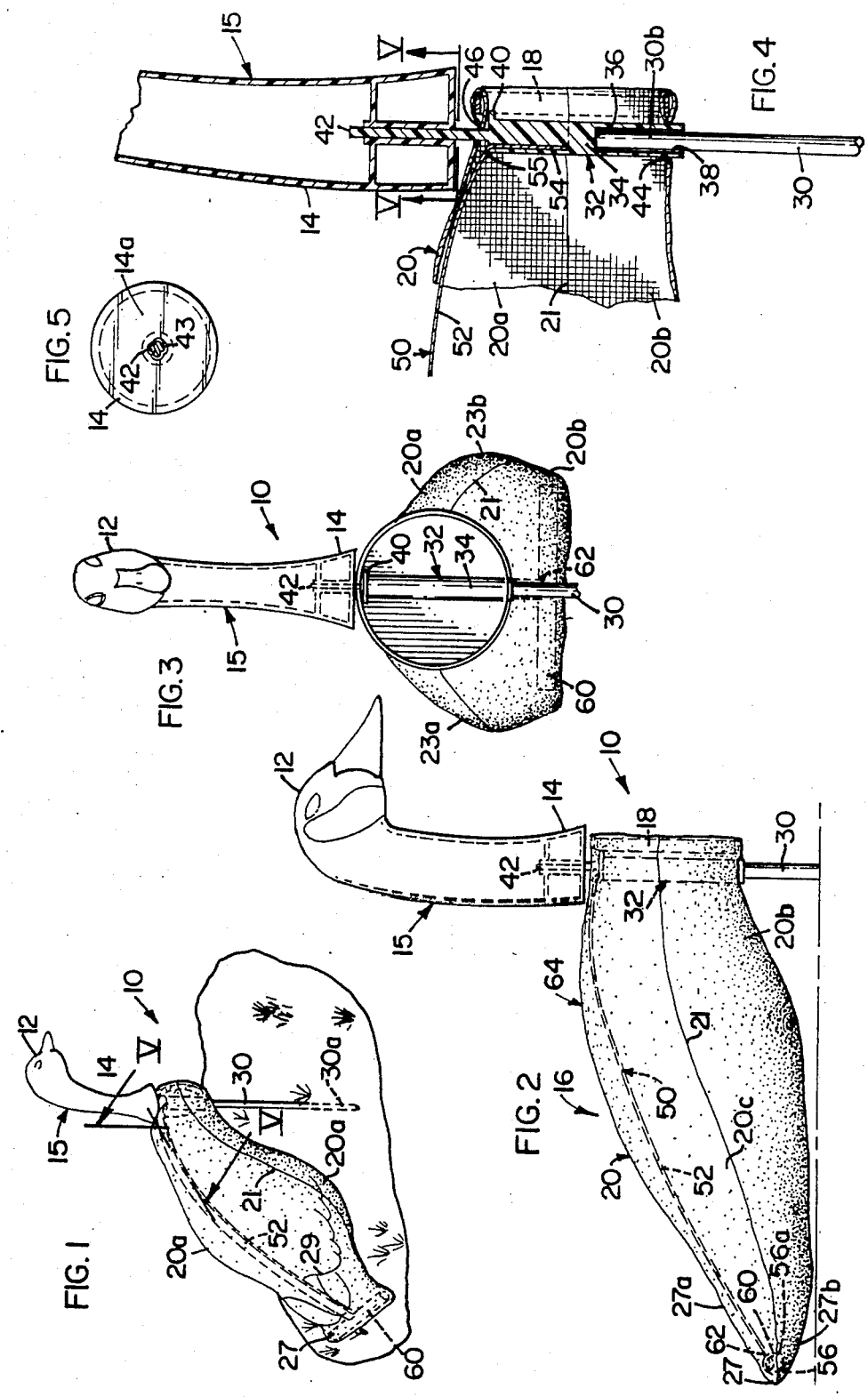

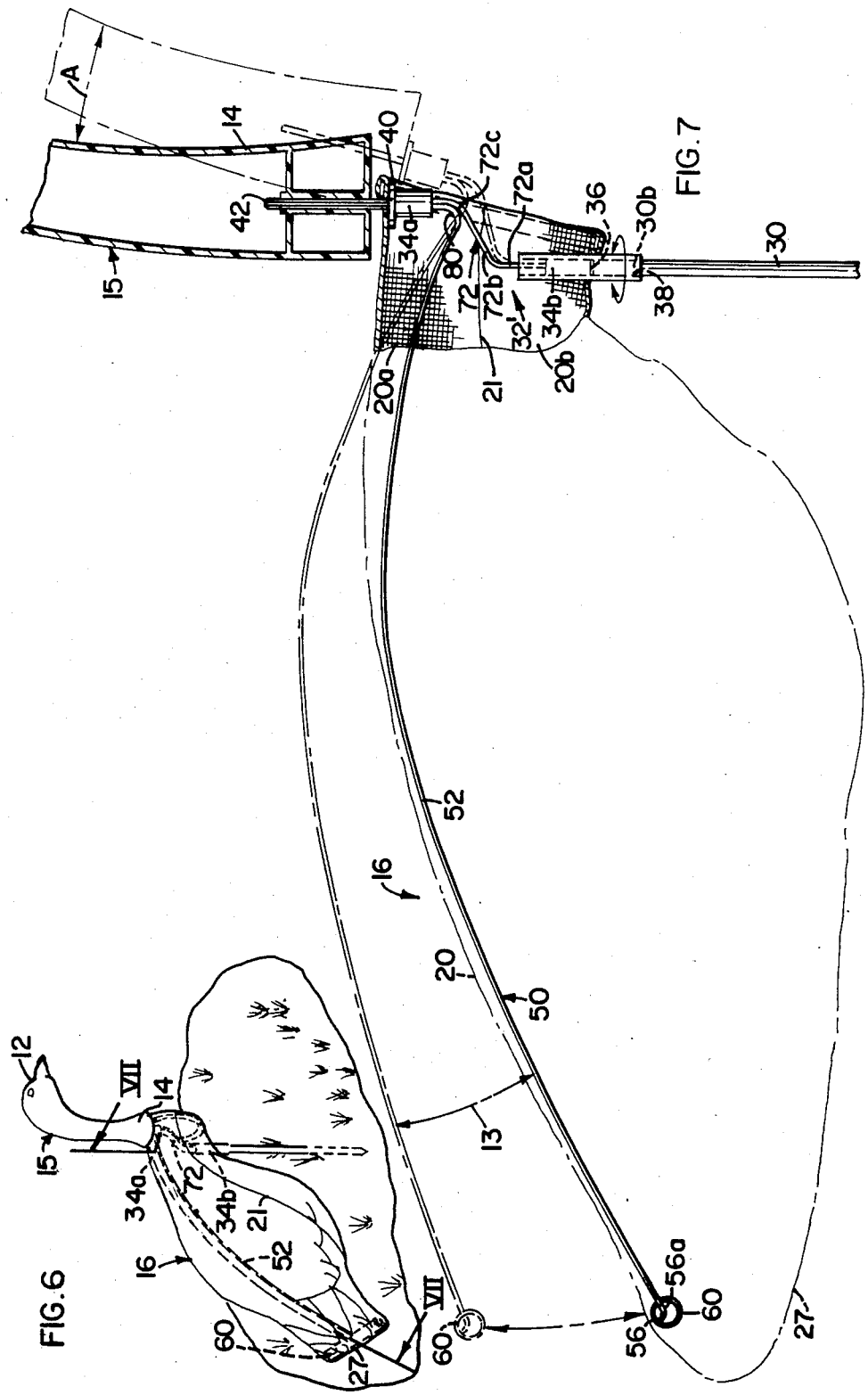

SUPPORT FOR GOOSE DECOY

BACKGROUND OF THE INVENTION

I. Field of the Invention

This invention relates to decoys for water fowl and more particularly to decoys having body portions of wind sock construction which suggest the appearance of a body of water fowl.

II. Description of the Prior Art

U.S. Pat. No. 4,062,141 to Shjeflo dated Dec. 13, 1977 teaches a decoy for water fowl such as goose or duck which has a head and neck portion made of rigid material and a hoop member. The head and neck are fixed to a spike inserted into the ground with the hoop portion rotatable on the spike about a generally vertical axis with the hoop maintaining its opening in the generally vertical plane. A flexible bag of wind sock construction is mounted on the hoop with an opening of the bag secured to the hoop and maintained in an open condition. The bag is so constructed that when wind enters the opening and fills the bag, the bag has the appearance of the body of a water fowl with a flared out center portion given the appearance of folded wings and a tapered rearward portion giving the appearance of the tail of the water fowl. As wind changes in direction, the bag and hoop pivot on the spike such that the hoop opening constantly faces the wind direction.

Decoys such as those described in the above referenced U.S. patent have enjoyed substantial success. The decoys are deployed in number near hunting grounds to attract water fowl. Due to the fluttering of the bag as air pressure varies through the bag, the fluttering together with the contour and markings of the decoy provides for a more lifelike decoy when compared to static decoys. Also, the wind sock construction decoys have also proven to be very popular as lawn ornaments.

Notwithstanding the tremendous success enjoyed by decoys as described above, such decoys do possess certain inherent problems. For example, although the bags do not require a tremendous amount of wind in order to inflate the bag to give the appearance of a water fowl, some wind is, of course, required. Accordingly, the usefulness of the bag is dependent upon uncontrolled variables such as wind. This is particularly troublesome where the decoys are used as lawn ornaments where they are typically placed in wind protected areas such as back yards and other enclosed areas.

Another problem associated with such prior art decoys is the bag often rubs on the ground. This is particularly true when the bag is subjected to varying wind velocities and varying wind directions. As a result, the bag can wear through which damages the wind sock construction and defeats its purpose. Also, such bags are known to wrap around the stake supporting the wind sock above the ground much like a flag wraps around its flag pole. When this occurs, the wind sock is totally useless for its intended purpose in that it cannot fill with air to obtain a shape suggesting the appearance of a water fowl. And finally, while the wind sock may vary its direction to accommodate for directions in the wind, the head and neck of the decoy remain stationary such that the head of the water fowl could be facing the same direction as the tail of the water fowl. Particularly with a number of decoys arranged either to attract water fowl or for lawn decoration purposes, such an arrangement is unrealistic and detracts from the realism attempted to be achieved by this apparatus.

SUMMARY OF THE INVENTION

According to a preferred embodiment of the present invention, there is provided a decoy for water fowl having a head and neck portion made of relatively rigid material and a body portion which includes a hoop member and a flexible bag of wind sock construction having an opening secured to the hoop member with the hoop member maintaining the opening in an open condition. A spike is provided for insertion into the ground to support the decoy. A hoop support is provided for supporting the hoop in a generally vertical position with the hoop support rotatably connected to the spike for rotation about a generally vertical axis of rotation. The head and neck portion are connected to the hoop support. A bag support is connected to the hoop support for rotation therewith and extends toward a tail end of the bag to maintain the bag in a full condition.

BRIEF DESCRIPTION OF THE DRAWINGS

FIG. 1 is a perspective view of a decoy incorporating the present invention;

FIG. 2 is a side elevation view of a decoy taken partially in cross-section showing a preferred hoop support;

FIG. 3 is a frontal elevation view of a decoy incorporating the present invention;

FIG. 4 is a side elevation view of a decoy incorporating the present invention;

FIG. 5 is a view taken along line V—V of FIG. 2;

FIG. 6 is a perspective view of a decoy incorporating the present invention in an alternative embodiment; and FIG. 7 is a view of the alternative embodiment of the present invention showing an alternate hoop support.

DESCRIPTION OF THE PREFERRED EMBODIMENT

Referring to FIGS. 1 through 5, a decoy is generally shown at 10. Throughout the discussion that follows, decoy 10 will be referred to as a goose decoy. However, it will be appreciated that this representation is for purpose of example only and the decoy could be any animal, but preferably a water fowl such as a duck, goose or more exotic water fowl such as a flamingo for yard decoration.

The decoy 10 includes a simulated head 12 and simulated neck portion 14 integrally connected to the head 12 to form a composite head and neck member 15. Preferably the head and neck member 15 is formed of integrally molded relatively rigid material such as synthetic plastic. The decoy also includes a body portion 16 having a metal hoop 18. The body portion 16 includes a flexible bag 20 made of very light weight nylon or plastic material which includes an upper panel 20a and lower panel 20b formed together by a peripheral seam 21 at their outer edges to form an air tight bag closed upon its outer edges except for an opening 22 at its front end. The edges of a bag forming the opening 22 in the bag are fixed about the metal hoop 18 by the bag edges reversely wrapped or folded about the edges of the hoop and sewn together or otherwise substantially fixed. The metal hoop 18 is sufficiently rigid in shape to maintain the opening 22 in a circular open position. The upper and lower panels 20a and 20b each have a widened center portion 23a and 23b and a tail portion 27a and 27b, respectively so that when the bag is inflated and viewed from above, the bags wide center portion gives the appearance of folded wings of a goose and the tail portion 27 gives the appearance of a tail of a goose. Appropriate markings 29 can be provided on the bag to further suggest the appearance of a goose body. It will be appreciated that neck and head portions 14 and 12 and body portion 16 as described, form no part of this invention per se and, preferably, are such as those described in aforementioned U.S. Pat. No. 4,062,141.

To support the head and neck member 15 and body portion 16, a novel support is provided which is shown best in FIG. 2. The support includes a spike 30 of rigid material having one end 30a (shown in FIG. 1) for insertion into the ground with the spike extending generally vertically from the ground to a free end 30b. A hoop support 32 is provided including a body portion 34 having a bore 38 extending through one end of the hoop support and terminating at an inner abutting surface 36. The body portion 34 is received on spike 30 with free end 30b of spike 30 extending into the bore 38 and abutting surface 36 with body portion 34 freely rotatable on spike 30 about a generally vertical axis of rotation. The hoop support 32 also includes a radially extending flange 40 which is generally perpendicular to the axis of rotation, and a vertically extending neck support post 42 projecting vertically and axially from flange 40.

Referring to FIG. 5, the post 42 is provided with an X-shaped cross-section which is sized to be received within a similarly shaped opening 43 formed through the base 14a of neck 14. Accordingly, neck and head member 15 rotate with support 32.

An alternative embodiment of the present invention is provided having an alternative hoop support as shown in FIGS. 6 and 7 where like elements have same numeral identification. In the embodiment, the hoop support 32' is provided with an intermediate resilient portion. Intermediate resilient portion comprises a strip 72 of resilient material such as spring steel which extends between a first segment 34a of the neck support which include flange 40 to a second segment 34b which is rotatably mounted on spike 30. The strip 72 includes a first segment 72a extending vertically from second segment 34b and a vertical segment 72b extending downwardly from a first segment 34a. Spring segments 72a and 72b are misaligned and are joined by a middle segment 72c which includes necessary bends to form the continuous strip 72.

As shown in FIGS. 1 through 4, the bag 16 is supported on the hoop support 32 with body portion 34 extending through a hole 44 cut in a bottom panel 20b of the bag 20. The flange 40 abuts an inner surface of upper panel 20a with neck support panel 42 projecting through a hole 46 cut through upper panel 20a. Hole 46 and upper panel 20b and hole 44 and lower panel 20a are placed directly adjacent hoop 18 and are diametrically opposed such that the hoop support 32 extends through the diameter of the hoop 18 and opening 22.

A bag support 50 is provided rotatably mounted to spike 30 and includes a strip 52 of resilient material such as a narrow strip of elastic or resilient steel. The strip has a first end 54 which is connected to the body portion 34 of hoop support 32 which provide for rotary action of the support 50. First end 54 can be connected to body portion 34 in any suitable manner and preferably, body portion 34 is formed from molded plastic which includes a strip receiving slot 55 sized to receive first end 54 snuggly within body portion 34. The strip 52 extends from the body portion 34 and terminates at a free end 56 adjacent the tail 27 of the flexible bag 20 (shown best in FIGS. 2 and 7). A spreader 60 of suitable material such as plastic tubing or the like is provided having a length size to extend the length of the tail 27 of flexible bag 20. The spreader is provided with a slot 62 centrally located on the spreader and sized to receive free end 56 of strip 52. As shown, the free end 56 is provided with an upward bend 56a to capture the spreader 60 on the free end 56.

As best shown in FIG. 2, the strip 52 is provided projecting upwardly from body portion 34 such that the natural inclination of the strip 52 is to project upwardly and outwardly from body portion 34 having its length contoured by reason only of its weight. The weight of spreader 60 provides additional contour such that the free end 56 of the strip 52 is weighted down for the strip 52 to present a hump intermediate along its length.

With the decoy assembled as described above, the spreader 60 insures positioning of the resilient strip 62 centrally along the inner surface of the upper panel 28 of the flexible bag 20. The upward bend 64 of the strip and the weight of the spreader 60 cooperate to define a contour for the strip 52 which includes a hump portion 64. With the flexible bag 20 positioned over the support structure 50, the contour suggests the appearance of the spine of a water fowl. Furthermore, the structure of the support 50 and the spreader 60 maintain the bag 16 in a fill position even when no wind is blowing and keep the bag 16 off of the ground. As wind direction shifts, the hoop support 32 freely rotates on shaft 30. The body support 50 is secured to body portion 34 for rotation therewith and spreader 60 is urged by the tail 27 to rotate with wind direction. The body portion 16 and support structure 50 pivot on shaft 30 such that opening 22 faces the wind. With the head and neck portions 12 and 14 rigidly secured to the post 42, the head and neck portions maintain a realistic alignment with the body portion 16. Finally, due to its resilient nature, the strip 52 will continuously flex and change its contour slightly during changes in wind pressure. The resilient nature of the strip 52 will add further action to the body portion over and above that provided by the wind sock construction to further enhance the lifelike appearance of the body portion and improve its qualities as both a decoy and as a lawn ornament.

In the alternative embodiment shown in FIGS. 6 and 7 and as described above with reference to hoop support 32', strip 52 may be connected to either segment 32a or 32b but is preferably connected to segment 32a to provide greater action as will be described. The first end 54 of the strip 52 is received within a slot formed in segment 34a and projects downwardly therefrom and is provided with a generally semi-circular bend 80 such that the strip 52 tends to project radially upward and outwardly from the bend in a path similar to that of the previously described embodiment. As a result of the construction of the alternative embodiment, all of the advantages of the previously described embodiment are obtained in that the head and neck rotate about the shaft 30 with the body portion. Likewise, the strip 52 continues to provide the same benefits of giving a spine like contour to the body portion and the spreader 60 maintains the proper shape for the tail 27 of the body portion and properly aligns strip 52. The alternative embodiment provides additional benefits in that not only will the body portion have additional lifelike action due to the spring strip 52, but also the neck and head will have lifelike action since, in addition to having rotary action they will now have action which tends to pivot them relative to the stake 30 by reason of the resilient intermediate portion. As a result, neck and head member 15 may follow the action of the arrows A in FIG. 7 to continuously move between the position shown in solid lines and that shown in phantom lines. Simultaneously, the body will follow the action of arrows B.

From the foregoing, it can be seen how the present invention has been obtained in a preferred manner. While the present invention has been described by means of a preferred embodiment, it will be appreciated it is not intended that the scope of the invention be limited by the specific examples given. It is intended the present invention will include such modifications and equivalents as will appear to those skilled in the art. It is intended the present invention be limited only by the scope of the claims which are appended hereto.

What is claimed is:

1. A decoy comprising:
   a head portion;
   a neck portion secured to said head portion;
   a body portion including a hoop member and a flexible bag of wind sock construction having an opening at a front end with said bag secured to said hoop member with said hoop member maintaining said opening in an open condition;
   a spike for insertion into the ground;
   a hoop support means for rotatably connecting said hoop to said spike for rotation about a generally vertical axis of rotation;
   means for connecting said head and said neck portion to said hoop support means;
   a bag support means rotatably connected to said hoop support means for rotation about a generally vertical axis of rotation with said bag support means extending into said bag and engaging an upper portion of said bag in spaced relation from a lower portion of said bag.

2. A decoy according to claim 1 wherein said bag support means includes a narrow strip of resilient material having a first end connected to said hoop support means for rotation therewith and extending to a second end approximate a tail of said bag.

3. A decoy according to claim 1 wherein said bag support means includes a spreader at a tail of said bag sized to extend along the tail of said bag, and said bag support means includes an elongated member having a first end secured to said hoop support for rotation therewith and a second end secured to said spreader centrally thereon.

4. A decoy according to claim 1, including a spreader at a free end of said bag support means extending to support a tail of said bag in spread out condition and having a weight sufficient to contour said bag support means to suggest a spine of a water fowl.

5. A decoy according to claim 1 wherein said hoop support means includes an intermediate resilient member disposed between a first segment of said hoop support rotatably mounted on said spike and a second segment secured to said head and neck portions.

6. A decoy comprising:
   a head and neck portion;
   a body portion including a hoop member and a flexible bag of wind sock construction having an opening at a front end with edges of said bag adjacent said opening fixed to said hoop with said hoop maintaining said opening in an open condition;
   a spike for insertion into the ground;
   a hoop support including a flange for engaging an upper portion of said hoop from within said opening; a projecting rod projecting upwardly from said flange; said head and neck portion mounted on said rod and means for rotatably connecting said hoop support to said spike for free rotation of said hoop support about a generally vertical axis of rotation with said hoop support maintaining said opening in a substantially vertical plane;
   a bag support connected to said hoop support for rotation therewith and including an elongated resilient member extending along a center of said bag and having a spreader at a free end of said resilient member centrally positioned on said resilient member and extending along a tail of said bag.

7. A decoy according to claim 6 wherein said resilient member comprises a narrow strip of spring material having a contour from said first end to said second end to present an intermediate hump with said bag positioned on said spring providing an appearance of a spine of a water fowl.

8. A decoy according to claim 6 wherein said hoop support includes an intermediate portion separating said hoop support into a first segment including said flange and said projecting rod and a second portion rotatably mounted on said spike with said first and second portions connected by said intermediate portion which is a resilient spring member.

9. A decoy comprising:
   a head and neck portion;
   a body portion including a hoop member and a flexible bag of wind sock construction having an opening at a front end with said bag secured to said hoop member with said hoop member maintaining said opening in an open condition;
   a spike for insertion into the ground;
   a bag support sized to be received in said bag and maintain said bag with opposing upper and lower panels of said bag maintained in spaced apart relation;
   means for mounting said support on said spike for pivotal movement of said support and said bag about said spike;
   means for connecting said head and neck portion to said bag support for rotation of said head and neck portion with said bag support.

10. A decoy comprising:
    a head and neck portion;
    a body portion including a hoop-like member and a flexible bag of wind sock construction having an upper bag panel and a lower bag panel joined at outer edges of said panels to form an enclosed bag having an opening at a front end with edges of said bag adjacent said opening fixed to said hoop with said hoop maintaining said opening in an open condition;
    said bag having a flared out center portion and a tapered rearward portion;
    a spike for insertion into the ground;
    a hoop support having one end mounted on said spike for rotation on said spike about an axis generally coincident with an axis of said spike and means for connecting said support to said hoop to support said hoop in a plane with said opening generally vertical;
    means for connecting said head and neck portion to said hoop support for rotation therewith;

a bag support including an elongated member having a first end connected to said hoop support for rotation therewith and extending from said hoop support to a second end adjacent said rearward portion with a spreader secured to said second end and positioned centrally thereon with said spreader supporting said rearward portion in spread out condition and said bag support extending generally centrally along said upper panel on an inner surface thereof.

11. A decoy according to claim 10 wherein said extended strip is a narrow strip of resilient material.

12. A decoy according to claim 10 wherein said hoop support member is provided with an intermediate resilient portion.

* * * * *

UNITED STATES PATENT AND TRADEMARK OFFICE
CERTIFICATE OF CORRECTION

PATENT NO. : 4,611,421

DATED : September 16, 1986

INVENTOR(S) : Steven R. Jacob

It is certified that error appears in the above-identified patent and that said Letters Patent is hereby corrected as shown below:

Column 8, lines 3-4, "extented strip" should be
---elongated member---.

Signed and Sealed this

Third Day of February, 1987

Attest:

DONALD J. QUIGG

*Attesting Officer*  *Commissioner of Patents and Trademarks*